(12) United States Patent
McDonnell

(10) Patent No.: US 11,388,982 B1
(45) Date of Patent: Jul. 19, 2022

(54) AIR HOSE CLAMPING MECHANISM AND HOOK DEVICE AND METHOD

(71) Applicant: Benjamin McDonnell, Perth (CA)

(72) Inventor: Benjamin McDonnell, Perth (CA)

( * ) Notice: Subject to any disclaimer, the term of this patent is extended or adjusted under 35 U.S.C. 154(b) by 0 days.

(21) Appl. No.: 16/143,345

(22) Filed: Sep. 26, 2018

(51) Int. Cl.
*F16M 11/00* (2006.01)
*A45F 5/02* (2006.01)
*F16L 3/02* (2006.01)

(52) U.S. Cl.
CPC ............... *A45F 5/021* (2013.01); *F16L 3/02* (2013.01); *A45F 2200/0575* (2013.01)

(58) Field of Classification Search
CPC .................... F16L 3/02; A45F 5/021
See application file for complete search history.

(56) References Cited

U.S. PATENT DOCUMENTS

| | | | | |
|---|---|---|---|---|
| 2,525,236 | A * | 10/1950 | Palmer | A61F 9/068 128/205.25 |
| 3,683,907 | A * | 8/1972 | Cotabish | A62B 18/003 128/200.28 |
| 11,174,983 | B1 * | 11/2021 | Su | A47F 5/04 |
| 2019/0238736 | A1 * | 8/2019 | Morimitsu | F16M 11/2014 |
| 2020/0132227 | A1 * | 4/2020 | Li | F16L 3/02 |
| 2021/0362877 | A1 * | 11/2021 | Wang | F16M 11/123 |

* cited by examiner

*Primary Examiner* — Amy J. Sterling
(74) *Attorney, Agent, or Firm* — David W Barman

(57) ABSTRACT

An air hose clamping mechanism and hook device including an air hose clamping mechanism and hook assembly including: an air hose clamping mechanism; and a hook. The air hose clamping mechanism and hook device is an air hose clamping mechanism and hook for the air hose clamping mechanism and hook assembly; wherein the air hose clamping mechanism and hook assembly is in function combination an air hose clamping mechanism, and the hook whereby a tool coupled to an air hose is able to be suspended via the hook and the air hose clamping mechanism allowing one-way movement of the air hose.

16 Claims, 6 Drawing Sheets

AIR HOSE CLAMPING MECHANISM AND HOOK DEVICE AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of package and article carriers, supports, and elongated-member driving apparatus of existing art and more specifically relates to package and article carriers, supports, and elongated-member driving apparatus, including article held by hook, tool holder carried by belt, clip or hook attaching article carrier to support means on bearer, suspended supports, holdown, and work support.

RELATED ART

Professional contractors and do-it-yourself entrepreneurs rely heavily upon various pneumatic tools. Typically, pneumatic tools are coupled to a pressurized air hose that supplies pressurized air to operate the tool and perform various mechanical functions. When working in the roofing industry, for example, the contractor is required to be at height and the air hose for the pneumatic tool can become tangled or unexpectedly retract causing the tool to fall from the work platform causing damage or injury. Additionally, the air hose requires the contractor to single-hand maneuver the air hose in order to keep the tool functioning properly. This can cause much strain on the hand. An improved air hose and hook device is needed to allow one-way movement.

U.S. Pat. No. 9,314,911 to Scott D. Jacobson, Gary S. Ford, and Paul H. Kirk relates to a universal quick-change hook for pneumatic tools with the pneumatic tools being staple elements of constructions sites. Pneumatic tools are often hand-carried to specific locations and balanced on an available surface or between the knees of a worker while the worker uses two hands for related activities. A universal quick-change hook according to an embodiment of the invention can be coupled between fittings of a pneumatic tool and pneumatic hose without obstructing airflow though the fittings and provides a hook stop to protect fittings attached to the universal quick-change hook, preventing accidental activation of a connection release. The universal quick-change hook is configured to support the weight of an attached tool from a wide variety of different support means, such as a ladder, lumber stock, nail, or utility belt. The universal quick-change hook provides a worker with a convenient way to secure a hook to pneumatic tools in rapid fashion to be more efficient and competitive on a jobsite.

SUMMARY OF THE INVENTION

In view of the foregoing disadvantages inherent in the known package and article carriers, supports, and elongated-member driving apparatus art, the present disclosure provides a novel air hose clamping mechanism and hook device. The general purpose of the present disclosure, which will be described subsequently in greater detail, is to provide an air hose clamping mechanism and hook device to prevent the air hose from retracting while in use and prevent hand strain to the operator.

An air hose clamping mechanism and hook device is disclosed herein comprising: an air hose clamping mechanism and hook assembly including: an air hose clamping mechanism; and a hook. The air hose clamping mechanism and hook device comprises an air hose clamping mechanism and hook for the air hose clamping mechanism and hook assembly; wherein the air hose clamping mechanism and hook assembly comprises in function combination an air hose clamping mechanism, and the hook whereby a tool coupled to an air hose is able to be suspended via the hook and the air hose clamping mechanism allowing one-way movement of the air hose.

A method of use for the air hose clamping mechanism and hook device is also disclosed herein: the method comprising the steps of: providing an air hose clamping mechanism; and a hook; using the air hose clamping mechanism and hook device for a tool to be suspended allowing one-way movement of the air hose.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an air hose clamping mechanism and hook device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to package and article carriers, supports, and elongated-member driving apparatus of existing art and more specifically relates to package and article carriers, supports, and elongated-member driving apparatus, including article held by hook, tool holder carried by belt, clip or hook attaching article carrier to support means on bearer, suspended supports, holddown, and work support as to allow one-way movement of an air hose.

Referring now more specifically to the drawings by numerals of reference, there is shown in FIGS. 1-6, various views of the air hose clamping mechanism and hook device 100. All references to dimensioning is exemplary and provided as enabling means for the preferred embodiment and are not intended to be limiting in any way.

Figure 1:
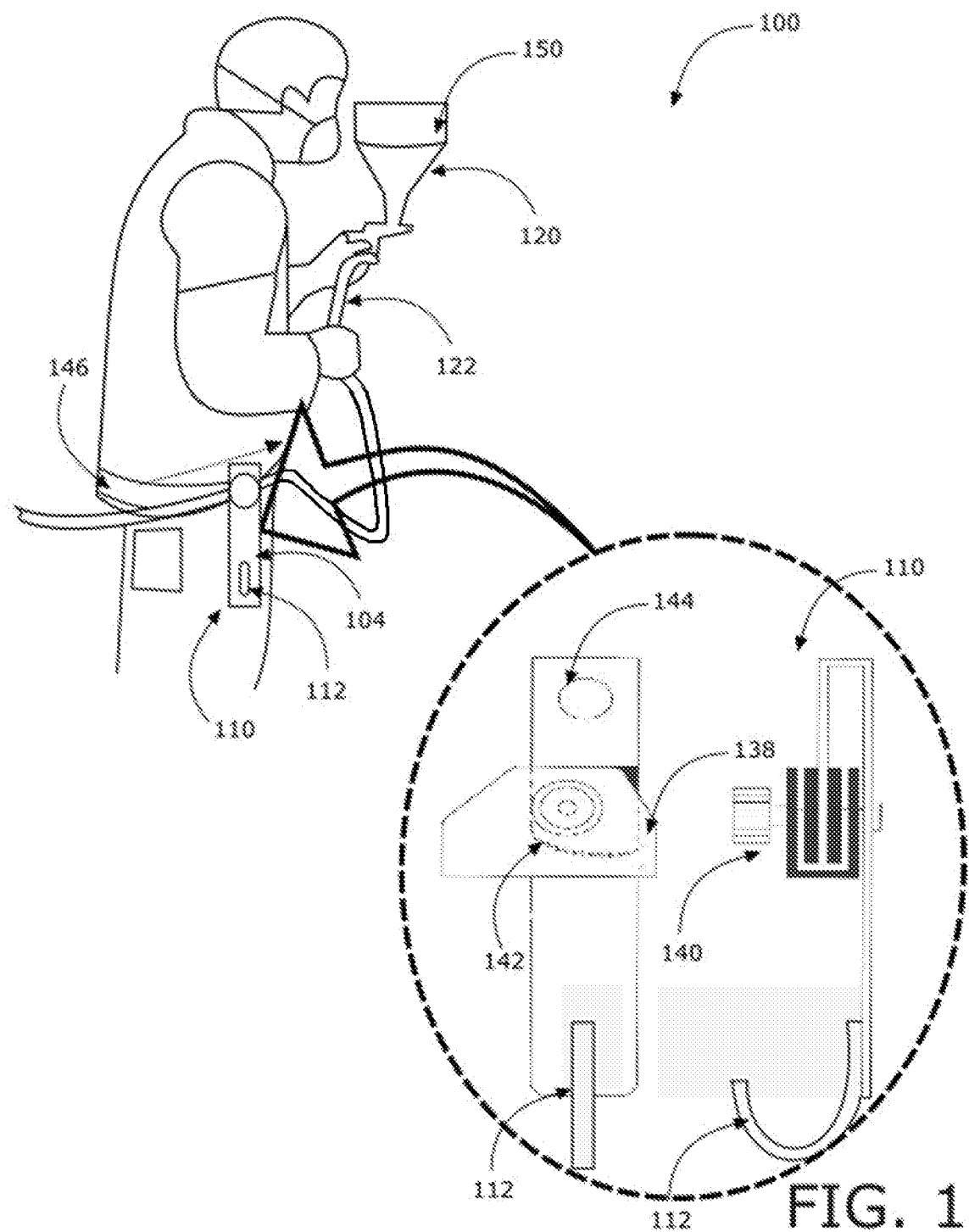
FIG. 1 is a perspective view of the air hose clamping mechanism and hook device ready for an 'in-use' condition, according to an embodiment of the disclosure.
Figure 2:
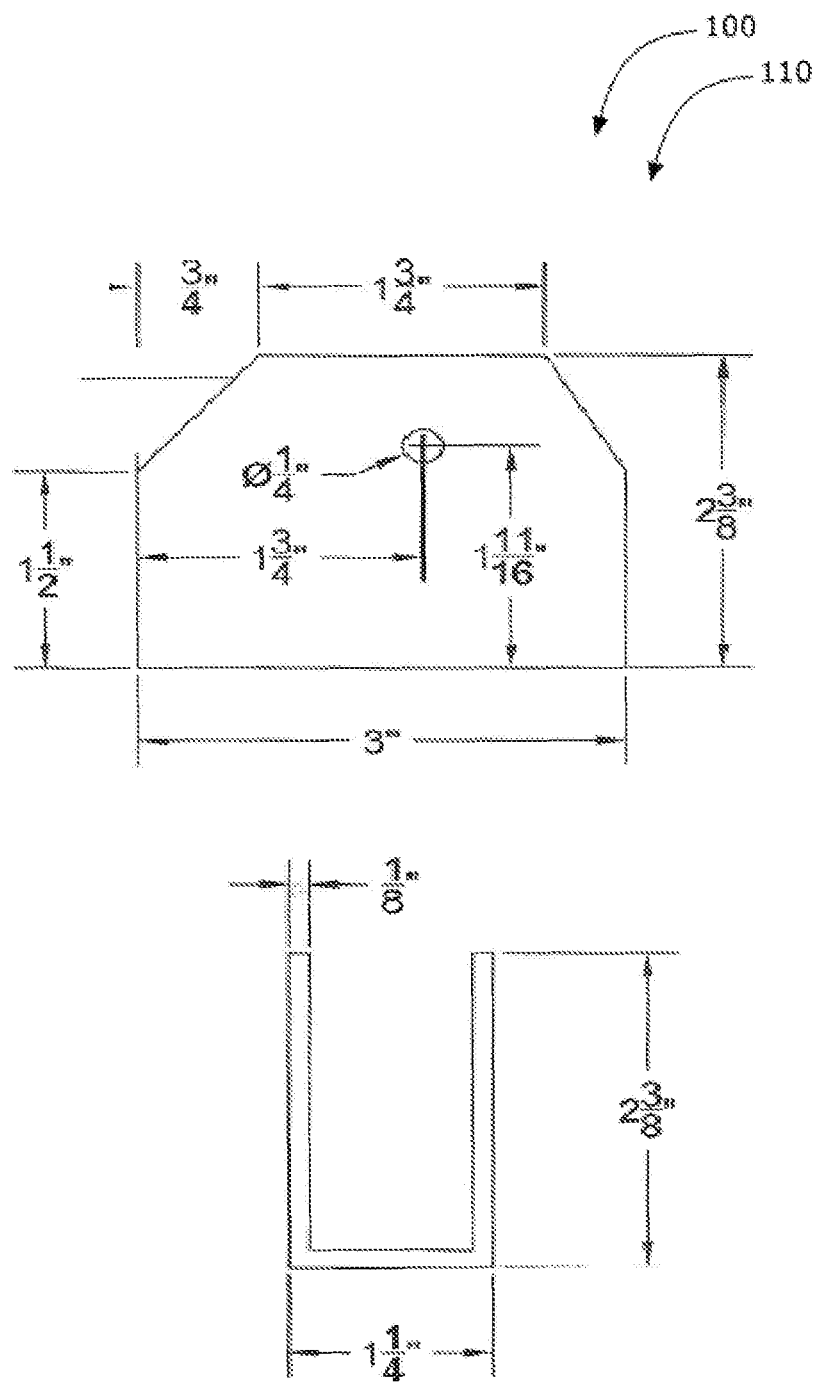
FIG. 2 is a perspective view of the air hose clamping mechanism and hook device of FIG. 1, according to an embodiment of the present disclosure.
Figure 3:
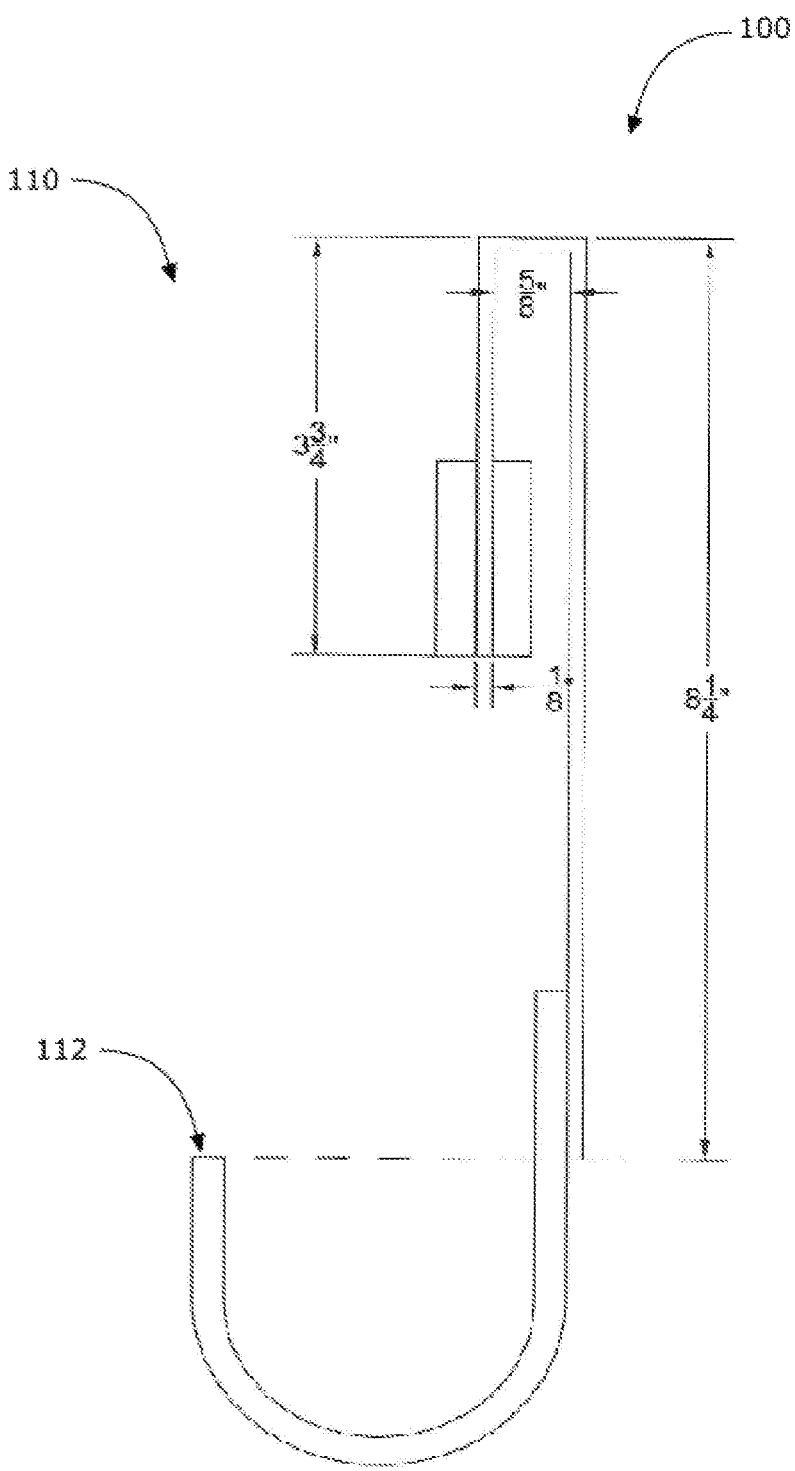
FIG. 3 is a perspective view of the air hose clamping mechanism and hook device of FIG. 1, according to an embodiment of the present disclosure.
Figure 4:
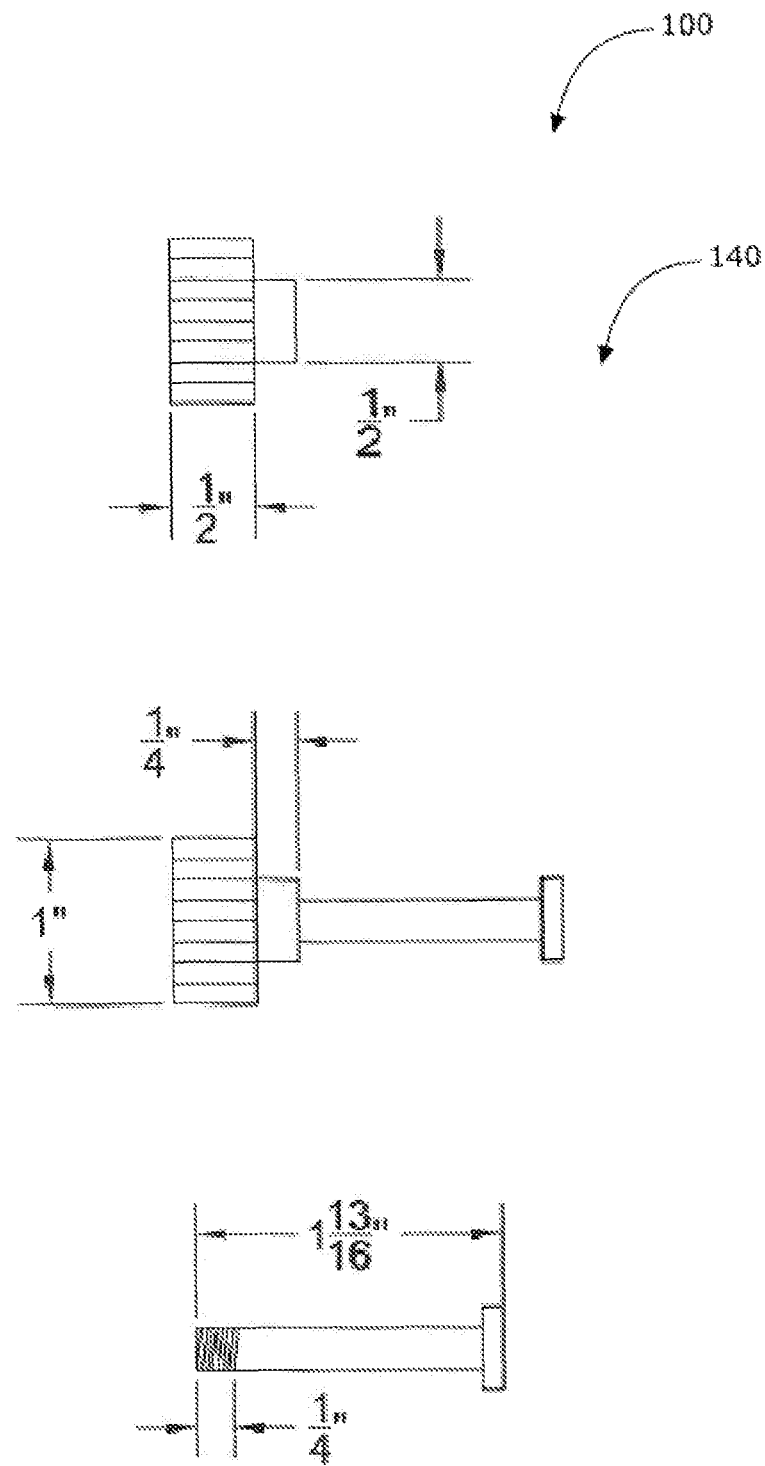
FIG. 4 is another perspective view of the air hose clamping mechanism and hook device of FIG. 1, according to an embodiment of the present disclosure.
Figure 5:
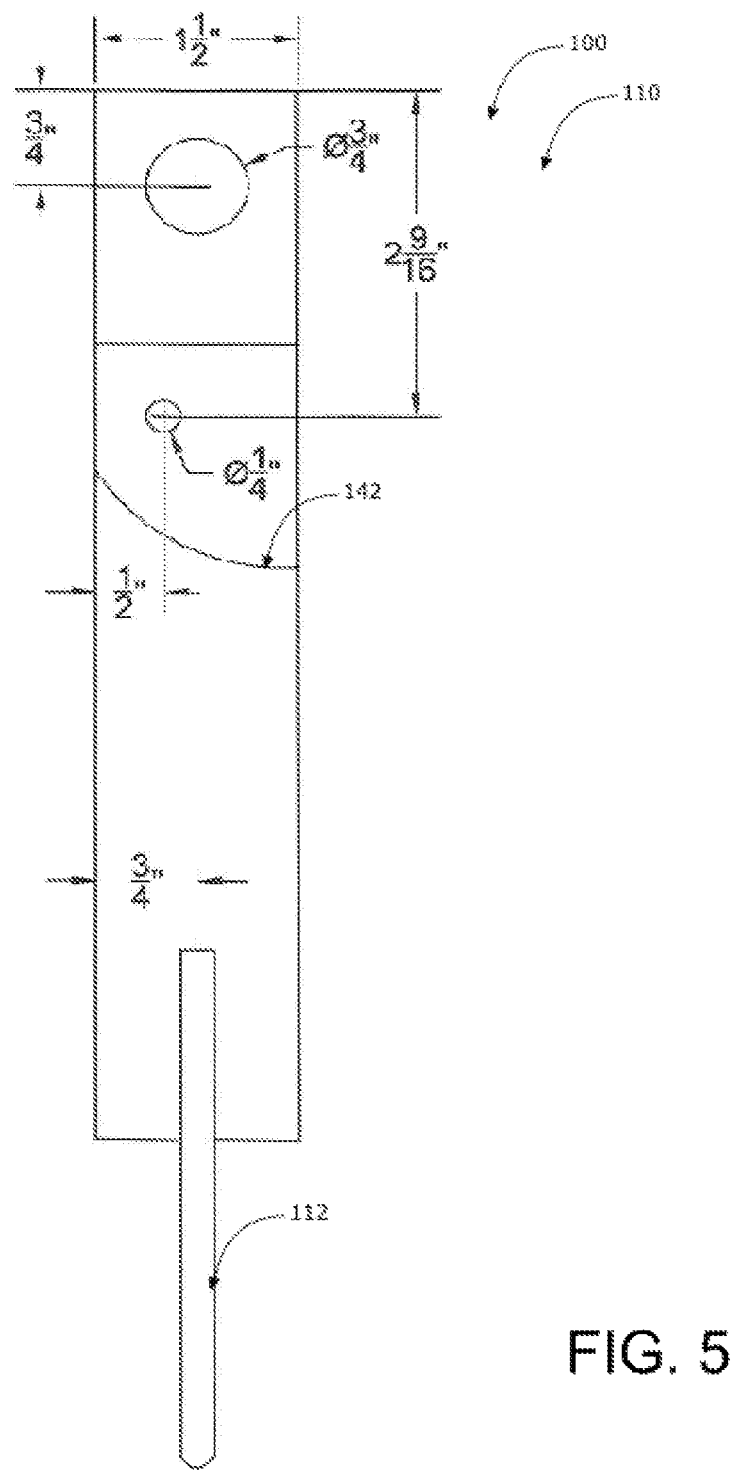
FIG. 5 is another perspective view of the air hose clamping mechanism and hook device of FIG. 1, according to an embodiment of the present disclosure.
Figure 6:
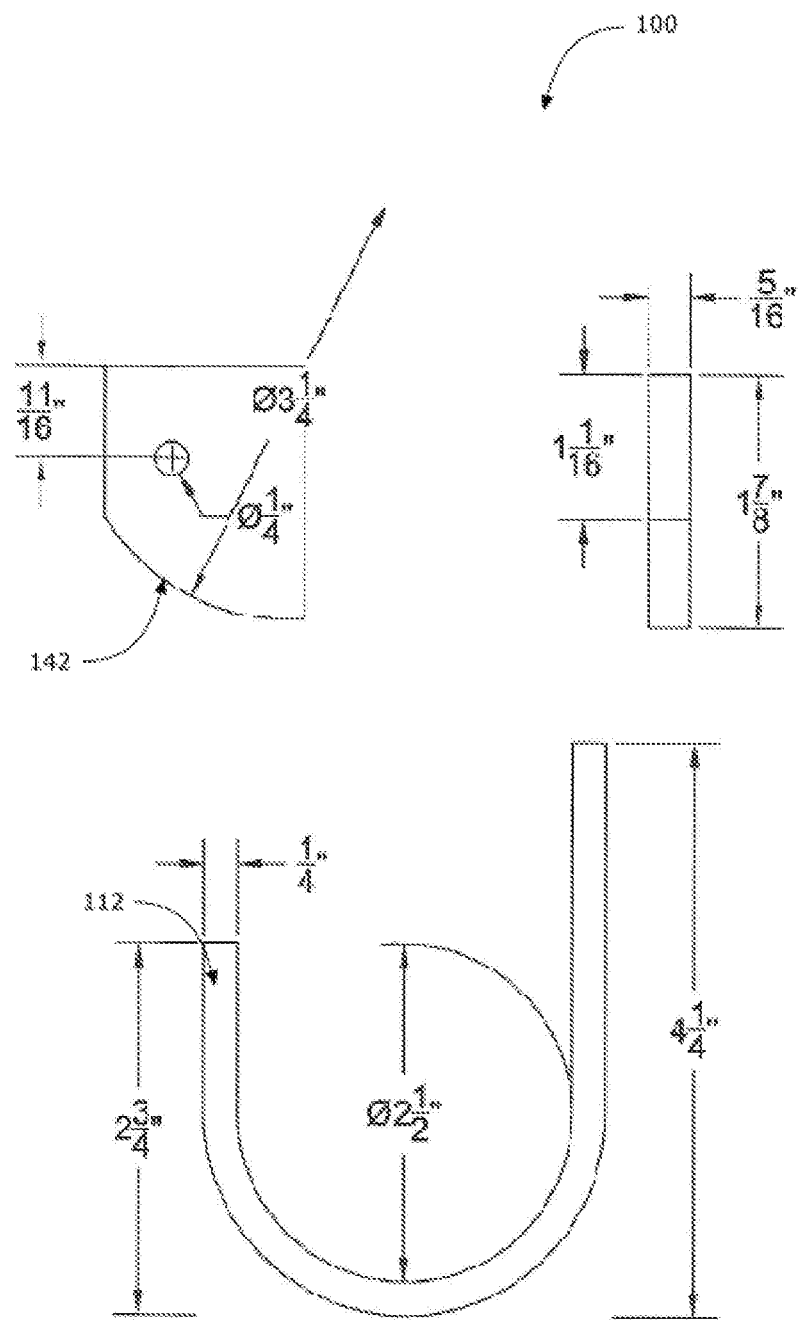
FIG. 6 is another perspective view of the air hose clamping mechanism and hook device of FIG. 1, according to an embodiment of the present disclosure.

FIG. 1 shows the air hose clamping mechanism and hook device 100, according to an embodiment of the present disclosure. Here, the air hose clamping mechanism and hook device 100 may be beneficial for a pneumatic tool 150 to be suspended and allowing one-way movement of the air hose 122. As illustrated, the air hose clamping mechanism and hook device 100 may comprise an air hose clamping mechanism and hook assembly 104 including an air hose clamping mechanism 110; and a hook 112. The air hose clamping mechanism and hook device 100 comprises the air hose clamping mechanism and hook assembly 104. The air hose clamping mechanism and hook assembly 104 comprises in function combination the air hose clamping mechanism 110, and the hook 112 whereby a tool 120 coupled to an air hose 122 is able to be suspended via the hook 112. The air hose clamping mechanism 110 also allows one-way movement of the air hose 122 as indicated by dotted arrow showing relative direction. In this way the present invention is able to prevent retraction of the air hose 122.

Referring now to FIGS. 2-6 showing various views of the air hose clamping mechanism and hook device 100 of FIG. 1, according to an embodiment of the present disclosure. As illustrated, the air hose clamping mechanism and hook device 100 comprises an air hose clamping mechanism 110 and a hook 112 positioned below the air hose clamping mechanism HO. The hook 112 is preferably J-shaped or U-shaped to avoid any corners or edges that may snag on clothing or equipment. The air hose clamping mechanism and hook device 100 comprises a vertical portion being integral with the hook 112 and the hook 112 defining a horizontal extension of the device 100. The air hose clamping mechanism and hook device 100 comprises the air hose clamping mechanism 110 with a pawl 138. The air hose clamping mechanism and hook device 100 comprises a hinge pin screw assembly 140 of the air hose clamping mechanism 110. The air hose clamping mechanism and hook device 100 comprises a hinge pin screw assembly 140 to adjust relative tightness of the air hose clamping mechanism 110. Other means for restricting relative movement of the air hose 122 may be used.

The air hose clamping mechanism and hook device 100 comprises a riveted teeth mounting plate 142 secured to the air hose clamping mechanism 110. The air hose clamping mechanism and hook device 100 riveted teeth mounting plate 142 is used to adjust tension of the air hose clamping mechanism 110. Here, the air hose clamping mechanism and hook device 100 prevents retraction of the air hose 122, to allow only one-way movement. The air hose clamping mechanism and hook device 100 also comprises an aperture 144 for attachment to a tool belt 146 such that it can be carried by a user in a hands-free condition. Additionally, the air hose clamping mechanism and hook device 100 comprises an aperture 144 for attachment to a carabiner (not shown). As illustrated, the air hose clamping mechanism and hook device 100 of claim comprises a pneumatic-tool 150. Additionally, the air hose clamping mechanism and hook device 100 hook 112 allows for accessible location of the pneumatic-tool 150 and accessibility of the air hose 122 for remote use.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in said appended claims:

1. An air hose clamping mechanism and hook device comprising:
   a air hose clamping mechanism and hook assembly including:
      an air hose clamping mechanism; and
      a hook;
   wherein said air hose clamping mechanism and hook device comprises said air hose clamping mechanism and hook for air hose clamping mechanism and hook assembly; and
   wherein said air hose clamping mechanism and hook assembly comprises in function combination said air hose clamping mechanism and said hook whereby a tool coupled to an air hose is able to be suspended via said hook and said air hose clamping mechanism allows one-way movement of said air hose.

2. The air hose clamping mechanism and hook device of claim 1 wherein said air hose clamping mechanism and hook device are joined together with the hook having at least a J-shape.

3. The air hose clamping mechanism and hook device of claim 2 wherein said air hose clamping mechanism and hook device are joined together at a bend to form said hook.

4. The air hose clamping mechanism and hook device of claim 3 wherein said air hose clamping mechanism and hook device comprises a vertical portion and horizontal portion joined together at said bend to form said hook having a vertical length portion less than a length of said horizontal portion.

5. The air hose clamping mechanism and hook device of claim 3 wherein said air hose clamping mechanism and hook device comprises a vertical portion being integral with said hook.

6. The air hose clamping mechanism and hook device of claim 1 wherein said air hose clamping mechanism and hook device comprises said air hose clamping mechanism with a pawl.

7. The air hose clamping mechanism and hook device of claim 4 wherein said air hose clamping mechanism and hook device comprises a hinge pin screw assembly of said air hose clamping mechanism.

8. The air hose clamping mechanism and hook device of claim 7 wherein said air hose clamping mechanism and hook device comprises said hinge pin screw assembly to adjust relative tightness of said air hose clamping mechanism.

9. The air hose clamping mechanism and hook device of claim 8 wherein said air hose clamping mechanism and hook device comprises riveted teeth mounting plate secured to said air hose clamping mechanism.

10. The air hose clamping mechanism and hook device of claim 7 wherein said air hose clamping mechanism and hook device comprises said riveted teeth mounting plate to adjust tension of said air hose clamping mechanism.

11. The air hose clamping mechanism and hook device of claim 8 wherein said air hose clamping mechanism and hook device prevents retraction of said air hose, to allow only said one-way movement.

12. The air hose clamping mechanism and hook device of claim 1 wherein said air hose clamping mechanism and hook device comprises an aperture for attachment to a tool belt such that it can be carried by a user in a hands free condition.

13. The air hose clamping mechanism and hook device of claim 1 wherein said air hose clamping mechanism and hook device comprises an aperture for attachment to a carabiner.

14. The air hose clamping mechanism and hook device of claim 3 wherein said tool comprises a pneumatic-tool.

15. The air hose clamping mechanism and hook device of claim 14 wherein said hook allows for accessible location of said pneumatic-tool and accessibility of said air hose for remote use.

16. An air hose clamping mechanism and hook device co p sing;
   an air hose clamping mechanism and hook assembly including:
      an air hose clamping mechanism; and
      a hook;
wherein said air hose clamping mechanism and hook device comprises said air hose damping mechanism and hook for air hose damping mechanism and hook assembly;
wherein said air hose clamping mechanism and hook assembly comprises in function combination said air hose clamping mechanism, and said hook whereby a tool coupled to an air hose is able to be suspended via said hook and said air hose damping mechanism allows one-way movement of said air hose;
wherein said air hose clamping mechanism and hook device are joined together to form at least a J-shape;
wherein said air hose clamping mechanism and hook device comprises a vertical portion and horizontal portion joined together at a bend to form said hook;
wherein said air hose clamping mechanism and hook device comprises said vertical portion and horizontal portion joined together at said bend to form said hook having a vertical length portion less than a length of said horizontal portion;
wherein said air hose clamping mechanism and hook device comprises said vertical portion being integral with said hook;
wherein said air hose clamping mechanism and hook device comprises said air hose clamping mechanism with a pawl;
wherein said air hose clamping mechanism and hook device comprises a hinge pin screw assembly of said air hose clamping mechanism;
wherein said air hose clamping mechanism and hook device comprises said hinge pin screw assembly to adjust relative tightness of said air hose clamping mechanism;
wherein said air hose clamping mechanism and hook device comprises riveted teeth mounting plate secured to said air hose clamping mechanism, wherein said air hose clamping mechanism and hook device comprises said riveted teeth mounting plate to adjust tension of said air hose clamping mechanism;
wherein said air hose clamping mechanism and hook device prevents retraction of said air hose, to allow only said one-way movement;
wherein said air hose clamping mechanism and hook device comprises an aperture for attachment to a tool belt such that it can be carried by a user n a hands-free condition;
wherein said air hose clamping mechanism and hook device comprises an aperture for attachment to a carabiner;
wherein said tool comprises a pneumatic-tool; and
wherein said hook allows for accessible location of said pneumatic-tool and accessibility of said air hose for remote use.

\* \* \* \* \*